March 4, 1924.

F. V. ELBERTZ 1,485,376

FRONT AXLE CONSTRUCTION

Filed Jan. 22, 1919

Inventor
Frank V. Elbertz.
By
Atty's

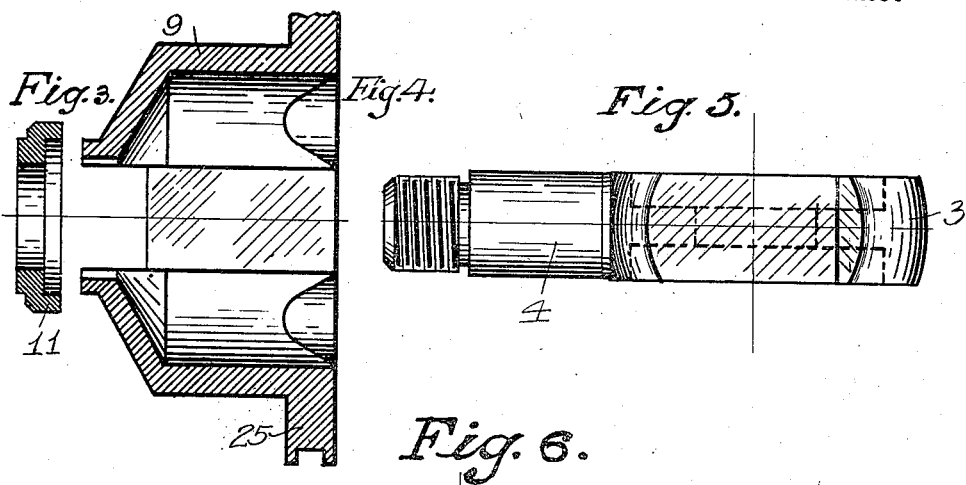
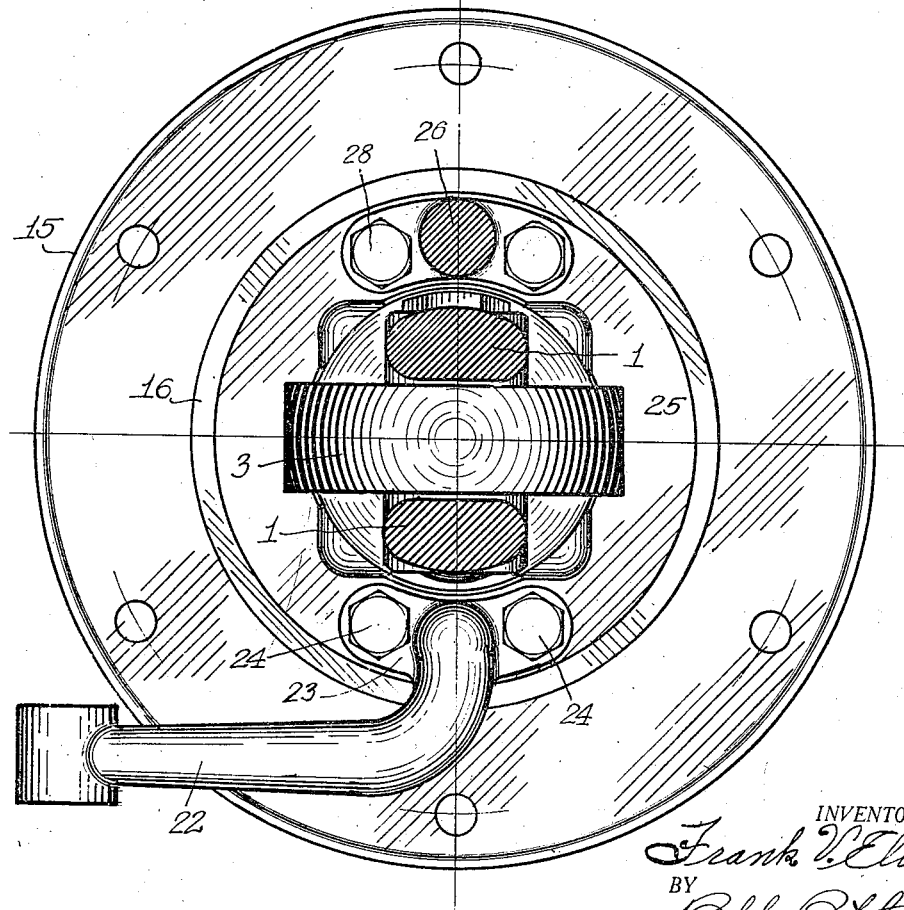

Patented Mar. 4, 1924.

1,485,376

UNITED STATES PATENT OFFICE.

FRANK V. ELBERTZ, OF DETROIT, MICHIGAN, ASSIGNOR OF ONE-HALF TO B. F. EVERITT COMPANY, OF DETROIT, MICHIGAN, A CORPORATION OF MICHIGAN.

FRONT-AXLE CONSTRUCTION.

Application filed January 22, 1919. Serial No. 272,444.

*To all whom it may concern:*

Be it known that I, FRANK V. ELBERTZ, a citizen of the United States of America, residing at Detroit, in the county of Wayne and State of Michigan, have invented certain new and useful Improvements in Front-Axle Constructions, of which the following is a specification, reference being had therein to the accompanying drawings.

In the operation and use of the forward guide bearing wheels for automobiles of the knuckle type, it is advisable that as much as possible of the side thrust and torsion due to shocks be removed from the steering knuckles, it being preferable to bring the vertical plane of the load as nearly coincident with the vertical axis of the knuckle on which the wheel is mounted as construction will permit.

This invention relates to a front axle construction and the steering knuckle portion thereof whereby the centers of load and of oscillation of the wheel are made as nearly coincident as possible while at the same time the usual side inclination or camber of the wheel is provided for, and also the tilting of the axis of oscillation longitudinally of the vehicle so that the wheel tends to run in a straight line with a desired caster effect.

The invention consists in the matters hereinafter set forth, and more particularly pointed out in the appended claims.

In the drawings,

Fig. 3 is a view in detail of a thrust collar;

Fig. 4 is a view in detail of a main bearing cap;

Fig. 5 is a view in detail of a knuckle shaft, and

Fig. 6 is a view in detail taken on or about line VII—VII of Fig. 1.

Figure 1:
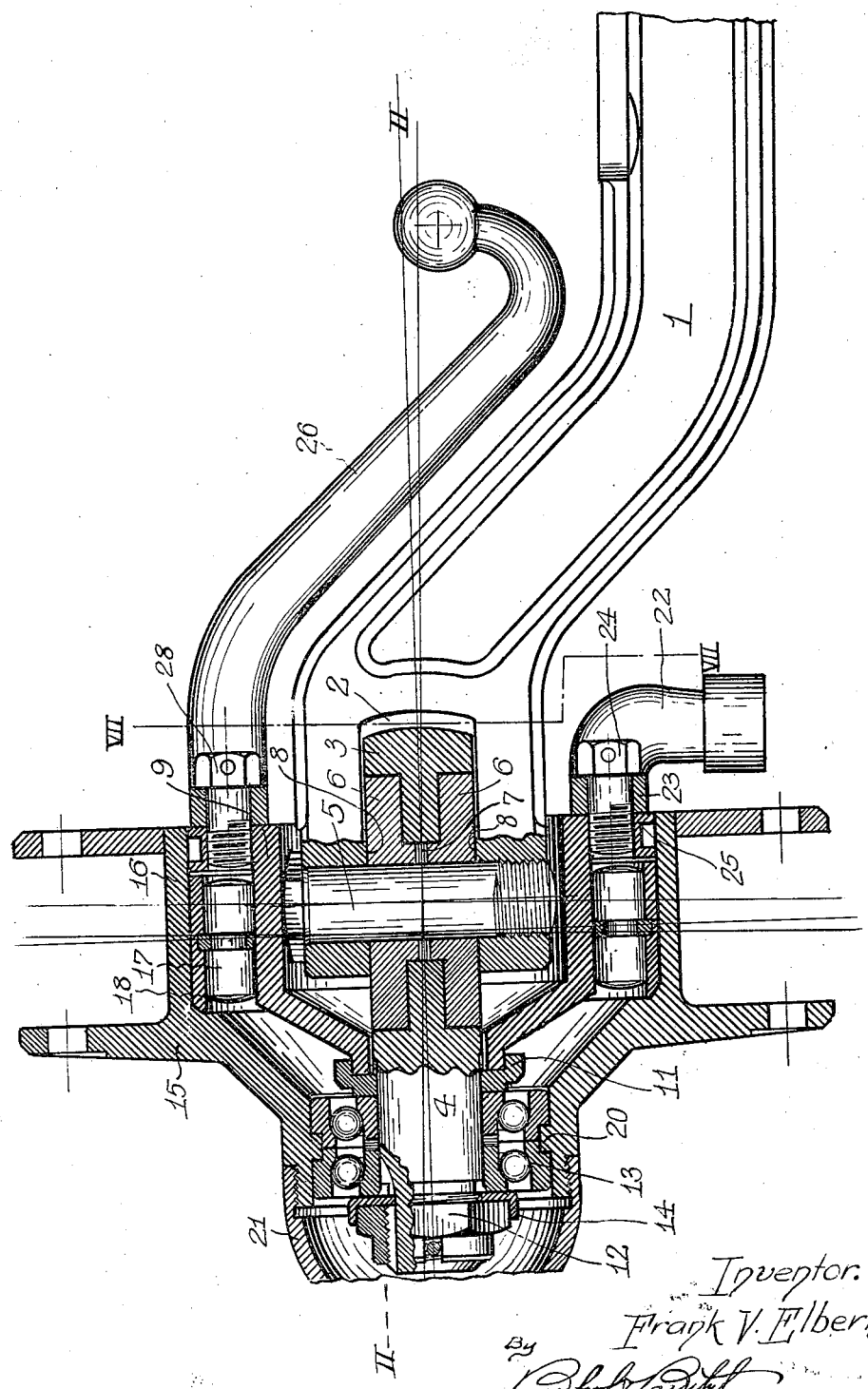
Figure 1 is a view in vertical section, partially broken away and in elevation of the outer portion of the steering axle that embodies features of the invention, together with parts of the wheel hub.
Figure 2:
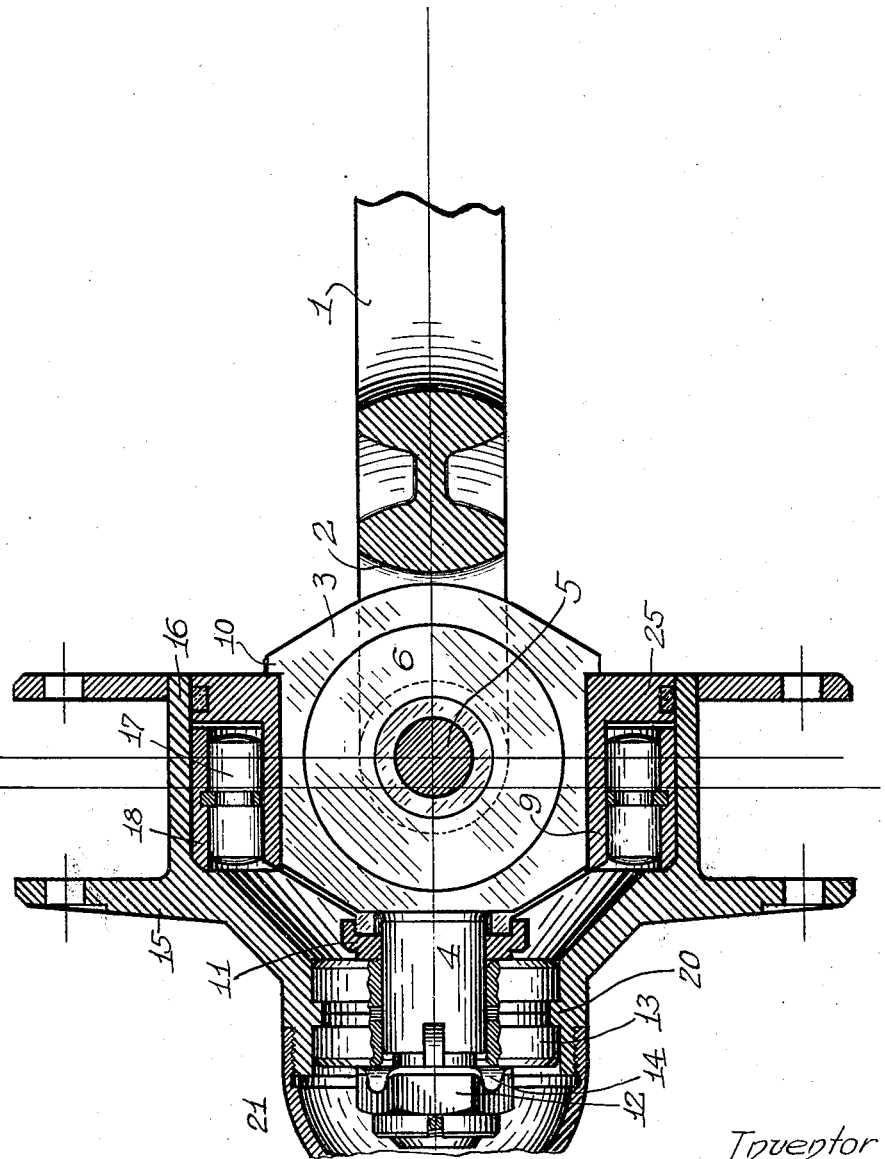
Fig. 2 is a view in horizontal section taken on or about line II—II of Fig. 1.

Referring to the drawings an axle 1 of conventional type, so far as the body portion is concerned, has end portions each with a longitudinal slot 2. A flattened body portion 3 of a stub axle with pintle 4 is oscillatory in the slot 2 on a pivot pin 5 which is centered in an enlarged opening of the body 3 by the two sections 6 of a bearing disk, the opening being counterbored from both sides and the sections 6 being correspondingly rebated or flanged to seat in the counterbore with shim plates 7 inserted so that the outer faces of the sections bear respectively against the faces 8 of the axle. The pin 5 is slightly inclined inwardly from the vertical and is likewise given a rearward tilt so as to bring the center tread portion of the tire beneath the vertical plane of the pin axis and the point of bearing of the wheel on the load a little rearwardly of the lower end of the pin and substantially vertically beneath the center of intersection of the stub axle 4 and the pin 5.

A main bearing hub 9 has an enlarged body that fits over the outer end portion of the axle and shoulders against bearing lugs 10 of the stub axle body 3. A thrust collar 11 on the stub axle 4 is forced against the bearing member 9 by a burr 12 on the stub axle end, ball bearing raceways 13 being interposed, and a washer 14 being used also if desired. A wheel hub 15 has a body portion 16 which receives the spokes and is journaled on the main barrel of the member 9 by appropriate anti-friction bearings, as for example, the rollers indicated at 17. In such construction the member 9 may form the inner raceway itself with an outer race ring 18 and center spacing ring. As a further detail of good construction the raceways 13 may be rebated at the meeting sides to embrace a retaining flange 20 which locks the wheel against endwise movement. A dust cap 21 houses the inner bearing.

A steering arm 22 has the base portion 23 thereof secured by studs 24 or the like to a flange 25 of the bearing member 9. The wheels are connected by the usual cross rod engaging spindle arms 26 each of which is secured by studs 28 to the flange 25 of the member 9.

One feature of the construction is the housing of the parts so that they can be packed in lubricant, thus eliminating all trouble from dust. Another advantage is the coincidence of the pivot axis and the wheel center within the solid bearing end part of the axle thus eliminating all tendency to shear. A further most important fact resulting from this coincidence is the elimination to a great extent of side strain and shock on the steering knuckle arm, as the wheel tends to run in a straight line because of the off center thrust of the load together with the vertical coincidence of the turning axis and the load strain. The steering knuckle arm is brought close to the center of oscillation of the wheel and this reduces the leverage and further minimizes the side shocks.

Obviously, changes in the details of construction may be made without departing from the spirit of my invention and I do not care to limit myself to any particular form or arrangement of parts.

What I claim is:—

1. The combination of an axle having a longitudinal bearing slot in the end portion, a stub axle pivoted in the slot, the vertical dimension of the stub axle being less than the similar dimension of the main axle, a bearing hub of unbroken annular type secured on the stub axle around the main axle, the pivot of the stub axle being located interiorly of the hub, a wheel hub journalled on the bearing hub, the pivot of the stub axle being in substantially the load plane of the wheel hub, and means for holding the wheel hub detachably in position, the pivot connections between the axles including a pivot pin with the connections presenting a bearing face concentric with the pin and within the planes of the stub axle, said face having a diameter materially greater than that of the pin, the face-carrying member being operative to space the latter from stub axle contact.

2. The combination in a vehicle, of an axle having a longitudinal bearing slot with opposed parallel bearing faces, a pivot pin extending therethrough, perpendicular to the bearing faces, the pin being disposed obliquely to the vertical load plane of the axle, a stub axle having a body encircling the pivot pin and a pintle extending beyond the axle, a bearing disk journaled on the pin and seated in the body in operative contact with the bearing faces of the slot, a bearing member interlocking with the body of the stub axle and enveloping the slotted end portion of the axle in substantially the axial plane of the pin, an anti-friction bearing on the pintle locking the wheel hub and bearing member in position, means for securing the bearing on the pintle, and means secured to the main bearing member for oscillating the latter on the pivot.

3. In combination, a main axle, a stub axle having a pintle, said main axle having a longitudinal end slot to receive a stub axle portion, a pin connection for the main axle and the stub axle portion to permit pivotal movement of the stub axle, a bearing hub carried by the pintle of the stub-axle and overlying the pin connection, and means for operatively connecting the bearing hub and stub-axle to permit the hub to control the pivotal movements of the stub axle, said latter means including complemental faces on the hub and stub axle portions adapted to provide an extended contact thereof at points on opposite sides of and spaced from the pin connection, said pin connection including a pivot pin with the connection presenting a bearing face concentric with the pin and within planes of the stub axle, said face having a diameter materially greater than that of the pin, the member carrying the face being operative to space the pin from and out of contact with the stub axle.

4. In combination, a main axle having a slotted end, a stub axle having its vertical dimension less than the similar dimension of the main axle and having a portion extending within the slot, a pin carried by the main axle and extending through the stub axle portion, a bearing hub of unbroken annular type carried by the stub axle and operatively connected with the steering mechanism, said hub overlying said pin, and means carried by the stub-axle portion to produce a pivotal bearing for the stub axle of greater diameter than and concentric with the pin, and operative to maintain said pin spaced from and out of contact with the stub axle.

In testimony whereof I affix my signature in the presence of two witnesses.

FRANK V. ELBERTZ.

Witnesses:
O. F. BARTHEL,
ANNA M. DORR.